Aug. 23, 1932.   H. D. ELSE ET AL   1,873,561
CLUTCH QUIETING MEANS
Filed April 2, 1931
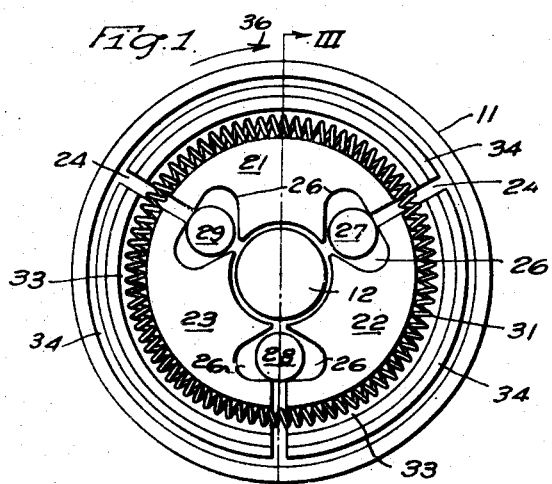
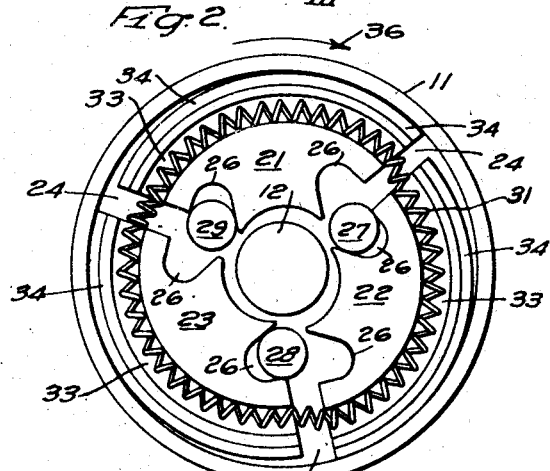
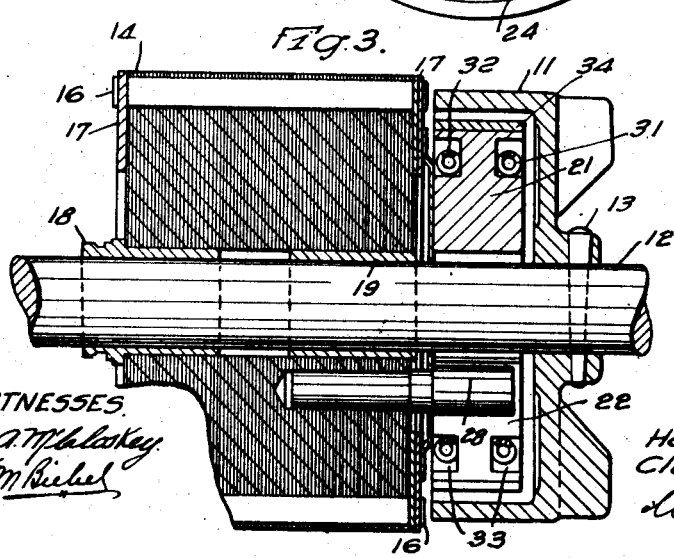
WITNESSES
INVENTORS
Harry D. Else and
Clarence R. Libby.
BY
ATTORNEY Patented Aug. 23, 1932

1,873,561

UNITED STATES PATENT OFFICE

HARRY D. ELSE AND CLARENCE R. LIBBY, OF SPRINGFIELD, MASSACHUSETTS, ASSIGNORS TO WESTINGHOUSE ELECTRIC & MANUFACTURING COMPANY, A CORPORATION OF PENNSYLVANIA

CLUTCH QUIETING MEANS

Application filed April 2, 1931. Serial No. 527,190.

Our invention relates to centrifugally actuable clutches and particularly to means for quieting the operation of such clutches.

An object of our invention is to provide a relatively simple and efficient means for quieting a centrifugally actuable clutch which may operate to produce a plurality of hammer blows in case of a sudden overload thereon.

Reference is here made to a copending application for United States Letters Patent, Serial No. 433,930, filed by H. D. Else on March 7, 1930 and assigned to the Westinghouse Electric & Manufacturing Company.

In the early experimental work incidental to the development of this device, it was found that there was a tendency of the weights to rattle on the driving pins, and the present application is filed to disclose and claim means for preventing such rattle during the operation of the clutch.

In practicing our invention, we provide a plurality of centrifugally-actuable weights distributed uniformly within and adjacent to the inner periphery of a driven shell, the peripheral extent of the weights being such that there will be a clearance between each two adjacent weight ends. Recesses of approximately V-shape are provided in the ends of the weights which are of such dimensions and are so located, relative to a corresponding plurality of driving pins, that a radially outer wall of each recess will engage the radially outer portion of the pin extending into pairs of adjacent recesses. With this construction, a pin trailing a leading weight will drive the weight, the outer leading peripheral edge portion of which will be in engagement with the shell at all speeds above a predetermined speed. A pair of garter springs are located in similar recesses in the side faces of the weights.

In the single sheet of drawing,

Figure 1 is a view, in end elevation, of a clutch embodying our invention and shown in its inactive position, Fig. 2 is a view, similar to Fig. 1, but showing the weights in their normal active positions at and above a predetermined speed, and, Fig. 3 is a view in axial section, through a rotor with which is associated with the device embodying our invention, the section through the clutch being taken on the line III—III of Fig. 1.

The device embodying our invention is particularly applicable to centrifugally-actuable clutches of the type disclosed and claimed in the hereinbefore mentioned application, Serial No. 433,930, filed by H. D. Else on March 7, 1930, which clutch includes a shell 11, of substantially cup-shape, which is adapted to be rigidly located on a motor shaft 12 on which it may be mounted and held in a predetermined position by a taper pin 13 extending through the hub portion of the shell and through the shaft itself. While we have shown a through tapered pin, we do not desire to be limited thereto, as any other suitable means satisfactory for the purpose may be employed.

The shaft 12 has a rotor 14 mounted thereon, which may be of the usual squirrel-cage type having a plurality of conducting bars 16 extending therethrough, the ends of which are connected by annular members 17, in a manner well known in the art. A pair of bushings 18 and 19 are located between the inner periphery of the rotor 14 and the shaft 12, and, while we have not shown the details of a rotor-locating device, any suitable or desired means may be provided to prevent axial movement of the rotor on the shaft. While we have shown no means for lubricating the bushings 18 and 19, relatively to the shaft 12, it is to be understood that such means will be provided, but, as this means constitutes no essential part of our present invention, we have not thought it necessary to illustrate the details thereof.

The shell 11 has a plurality of weights 21, 22 and 23 located therein which are substantially alike, each being of segmental shape in general outline, the peripheral extent being slightly less than one-third of the total periphery in order to provide a clearance 24 between each two adjacent radial ends of the weights. Each weight is further provided, at its inner corner and in each radial end, with a recess 26, of approximately V-shape, as is shown in Figs. 1 and 2 of the drawing.

Each of a plurality of driving pins 27, 28 and 29 has a portion extending into, and fitted tightly within, the body of rotor 14 so that the rotating rotor, when suitably energized by a stator structure, may cause the pins to move with it. The location of the pins 27, 28 and 29 and their diametral dimensions are such that, when the clutch is at rest, that is, at zero speed, the radially outer walls of the respective recesses 26 will be in engagement with radially outer portions of the peripheries of the respective driving pins, as is shown more particularly in Fig. 1 of the drawing.

A pair of garter springs 31 and 32 are located in arcuate recesses 33 in the side faces of the respective weights to cooperate therewith in holding them in substantially the positions shown in Fig. 1 of the drawing, up to a predetermined speed of rotation, when the weights will move radially outward to effect frictional engagement between surfacing or facing material 34 properly secured against the outer peripheries of the respective weights to provide wearing surfaces. The positions of the respective weights 21, 22 and 23, when in their active positions, may be seen in Fig. 2 of the drawing in which arrow 36 indicates the direction of rotation, which has been assumed for the purposes of illustration and discussion of the operation of the clutch and of our improved clutch-quieting means.

It is apparent from Fig. 1 of the drawing, that initially, the weights 21, 22 and 23 may move radially outwardly, but inasmuch as, with the assumed direction of rotation, pin 27 will drive weight 22, pin 28 will drive weight 23 and pin 29 will drive weight 21, the leading peripheral portion of each weight, as shown in Fig. 2 of the drawing, will tightly engage the inner surface of shell 11. This means that there is no direct engagement between the walls of a recess 26 in the leading edge of a weight and the driving pin leading this recess, but there will be a tight wedging and driving interfit between a driving pin and the trailing recess in a weight leading any one pin.

It may be here pointed out that the positions of the respective weights will be substantially opposite to that shown in Fig. 2 if the clutch is operated in the opposite direction to that indicated by arrow 36 but that the description hereinbefore given, as to the trailing pin driving a leading weight, will still be true.

We have found, as the direct result of numerous experiments made by us during the development of the clutch, that there may be a rattle of a weight on its driving pin under certain conditions of operation, one of these conditions being that of a pulsating torque, such as is present in the rotor of a single-phase motor.

We have also found that it is possible to eliminate the rattle by so dimensioning the weights 21, 22 and 23 that there will be a clearance space 24 (see Fig. 1) therebetween, and, further, by so dimensioning and locating the pins 27, 28 and 29, relative to the recesses 26, that the radially outer peripheral portion of each pin shall be engaged by the radially-outward wall portion of each recess, substantially as shown in Fig. 1 of the drawing, the springs 31 and 32 tending to hold the weights in this position at all speeds below a predetermined value and, because of the reactive forces set up during the operation of the clutch at normal speed, effective also to hold a trailing pin tightly in the trailing recess 26 in a weight leading said pin. This tight wedging interfit is maintained even under pulsating-torque conditions, and we have found that a clutch mechanism of this kind is substantially quiet.

Reference is here made to copending applications, Serial No. 522,291, by G. A. Leyner, filed March 13, 1931; Serial No. 527,191, by H. D. Else, filed April 2, 1931; and Serial No. 527,192, by C. R. Libby, filed April 2, 1931, relating to other forms of clutch-quieting devices, all being assigned to the same assignee as is the present application.

Since various modifications may be made in the device embodying our invention without departing from the spirit and scope of the invention, we desire that only such limitations shall be placed thereon as are imposed by the prior art or are set forth in the appended claims.

We claim as our invention:

1. In a clutch including a driven member, a centrifugally-actuable weight disposed to engage it at a predetermined speed, a driving means for the weight including a pin operatively engaged by the weight at all times, resilient means engaging the weight to maintain it continuously in operative engagement with the pin under pulsating-torque conditions thereof.

2. In a clutch including a driven member, a centrifugally-actuable weight disposed to engage it at a predetermined speed, a driving means for the weight including a pin fitting into a recess adjacent to the inner periphery of the weight, resilient means operatively associated with the weight for causing it to rest against the radially-outer portion of the pin at zero speed and for maintaining such engagement under pulsating-torque conditions of the pin.

3. In a clutch including a driven member, centrifugally-actuable weights disposed to engage it at a predetermined speed, each weight having a recess at each inner corner, a pin in each pair of adjacent recesses for driving one of the weights by a pin trailing a weight, and resilient means engaging the respective weights for initially so forcing them inwardly that a radially-outer wall of the recess engages a radially-outer portion of the pin and for ensuring that the trailing pin associated with any one weight shall maintain substantially such initial engagement under all operating conditions of the clutch.

4. In a clutch including a driven member, a centrifugally-actuable weight disposed to engage it at a predetermined speed, a driving pin fitting in a recess at the inner corner of the weight and engaging a radially-inner wall thereof, and resilient means engaging the weight to maintain such engagement and thereby prevent rattle of the weight on the pin under pulsating-torque conditions of the driving pin.

5. In a clutch including a driven member, centrifugally-actuable weights disposed to engage it at a predetermined speed, each weight having a recess at each inner corner, a pin in each pair of adjacent recesses for driving one of the weights by a pin trailing a weight and in engagement with a radially-inner wall of a recess, and resilient means engaging the respective weights for maintaining such engagement and thereby prevent rattle of the weight on the trailing driving pin under pulsating-torque conditions of the driving pin.

6. In a clutch including a driven member, a centrifugally-actuable weight disposed to engage it at a predetermined speed, and a driving pin fitting into a recess at an inner corner of the weight, resilient means engaging the weight for yieldingly opposing its movement because of centrifugal force and for maintaining a close wedging interfit of the pin in the recess under pulsating-torque conditions of the driving pin.

7. In a clutch including a driven member, a centrifugally-actuable weight disposed to engage it at a predetermined speed, and a driving pin fitting into a recess adjacent to the inner periphery of the weight, resilient means engaging the weight for yieldingly opposing the movement of the weight by centrifugal force and for maintaining a close wedging interfit of the pin in the recess under pulsating-torque conditions of the driving pin.

8. In a clutch including a driven member, a plurality of centrifugally-actuable weights disposed to engage it at a predetermined speed, each weight having a recess adjacent to its inner periphery, each two adjacent recesses being complementary to each other, driving pins extending into the pairs of adjacent recesses for respectively driving a leading weight at and above said predetermined speed, and a spring engaging the weights to yieldingly oppose the engaging movement of the weights and for ensuring close wedging fit of a trailing pin in the recess of a leading weight under pulsating-torque conditions of the driving pins.

9. In a clutch including a driven member, a plurality of centrifugally-actuable weights disposed to engage it at a predetermined speed, each weight having a recess at each of its inner corners, each two adjacent recesses being complementary to each other, driving pins extending into the respective pair of recesses for respectively engaging and driving a leading weight at and above said predetermined speed, and a spring engaging the weights to yieldingly oppose the engaging movement of the weights and for ensuring close wedging fit of a trailing pin in the recess of a leading weight under pulsating-torque conditions of the driving pins.

10. A device as set forth in claim 4, characterized in that only the leading end of the weight engages the driven member.

11. A device as set forth in claim 1, characterized in that the recess is located in the trailing end of the weight and the engagement between it and the driven member is at only the leading edge of the weight.

In testimony whereof, we have hereunto subscribed our names this 24th day of March, 1931.

HARRY D. ELSE.
CLARENCE R. LIBBY.